(12) United States Patent
Hong

(10) Patent No.: US 7,812,984 B2
(45) Date of Patent: Oct. 12, 2010

(54) REMOTE STORED PRINT JOB RETRIEVAL

(75) Inventor: Jiang Hong, San Jose, CA (US)

(73) Assignee: Ricoh Company, Ltd., Tokyo (JP)

( * ) Notice: Subject to any disclaimer, the term of this patent is extended or adjusted under 35 U.S.C. 154(b) by 1164 days.

(21) Appl. No.: 11/439,796

(22) Filed: May 23, 2006

(65) Prior Publication Data

US 2007/0273925 A1 Nov. 29, 2007

(51) Int. Cl.
*G06F 3/12* (2006.01)
*G06K 15/00* (2006.01)

(52) U.S. Cl. .................................. 358/1.15; 358/1.16

(58) Field of Classification Search .................. 358/1.1, 358/1.13, 1.15, 1.16, 1.18, 474; 709/201, 709/203, 211, 213

See application file for complete search history.

(56) References Cited

U.S. PATENT DOCUMENTS

| | | | |
|---|---|---|---|
| 5,633,932 A | 5/1997 | Davis et al. | |
| 5,845,066 A | 12/1998 | Fukuzumi | |
| 5,880,447 A | 3/1999 | Okada et al. | |
| 6,735,665 B1 | 5/2004 | Kumagai et al. | |
| 6,965,449 B2 | 11/2005 | Sugiyama | |
| 6,973,671 B1 | 12/2005 | Hsing et al. | |
| 7,002,703 B2 | 2/2006 | Parry | |
| 7,079,269 B2 * | 7/2006 | Teeuwen et al. | 358/1.15 |
| 7,136,176 B2 | 11/2006 | Sugiyama | |
| 7,170,623 B2 * | 1/2007 | Matoba et al. | 358/1.15 |
| 7,224,477 B2 | 5/2007 | Gassho et al. | |
| 7,359,076 B2 * | 4/2008 | Uchino | 358/1.15 |
| 7,450,260 B2 | 11/2008 | Takeda et al. | |
| 2002/0002503 A1 | 1/2002 | Matsuoka | |
| 2002/0021902 A1 | 2/2002 | Hosoda et al. | |
| 2002/0023143 A1 | 2/2002 | Stephenson et al. | |
| 2002/0059322 A1 | 5/2002 | Miyazaki et al. | |
| 2002/0120855 A1 | 8/2002 | Wiley et al. | |

(Continued)

FOREIGN PATENT DOCUMENTS

EP 1 091 275 4/2001

(Continued)

OTHER PUBLICATIONS

Claims, European patent application 07250426.9-1245, 3 pages.

(Continued)

*Primary Examiner*—Gabriel I Garcia
(74) *Attorney, Agent, or Firm*—Hickman Palermo Truong & Becker LLP; Christian A. Nicholes (57) ABSTRACT

A technique is disclosed for printing, at a local printing device, a print job that was previously stored at a remote printing device. According to one aspect of the technique, a command is received through a console of a local printing device at which a particular print job is not stored. In response to the receipt of the command through the console of the local printing device, the particular print job is requested from a remote printing device at which the particular print job is stored. The particular print job, sent from the remote printing device, is received at the local printing device. The particular print job is printed at the local printing device.

18 Claims, 5 Drawing Sheets

U.S. PATENT DOCUMENTS

| | | |
|---|---|---|
| 2003/0044009 A1 | 3/2003 | Dathathraya |
| 2003/0065404 A1 | 4/2003 | Bhatti |
| 2003/0090696 A1 | 5/2003 | Willis et al. |
| 2004/0056889 A1 | 3/2004 | Katano |
| 2004/0088378 A1 | 5/2004 | Moats |
| 2004/0090652 A1 | 5/2004 | Yoon |
| 2004/0117389 A1 | 6/2004 | Enami et al. |
| 2004/0125402 A1 | 7/2004 | Kanai et al. |
| 2004/0169884 A1 | 9/2004 | Yamada et al. |
| 2005/0068547 A1 | 3/2005 | Negishi et al. |
| 2005/0094195 A1 | 5/2005 | Sakamoto et al. |
| 2005/0141013 A1 | 6/2005 | Kikuchi et al. |
| 2005/0154884 A1 | 7/2005 | Van Den Tillaart |
| 2005/0182508 A1 | 8/2005 | Niimi et al. |
| 2005/0182822 A1 | 8/2005 | Daniel et al. |
| 2005/0254086 A1 | 11/2005 | Shouno |
| 2005/0268089 A1 | 12/2005 | Kim et al. |
| 2005/0273843 A1 | 12/2005 | Shigeeda |
| 2005/0273852 A1 | 12/2005 | Ferlitsch |
| 2005/0276618 A1 | 12/2005 | Clement et al. |
| 2006/0017954 A1 | 1/2006 | Ly et al. |
| 2006/0044589 A1 | 3/2006 | Nakagawaji |
| 2006/0112021 A1 | 5/2006 | Maki |
| 2006/0279760 A1 | 12/2006 | Wang et al. |
| 2006/0279761 A1 | 12/2006 | Wang et al. |
| 2006/0279768 A1 | 12/2006 | Wang et al. |
| 2008/0037052 A1 | 2/2008 | Nishiguchi |
| 2009/0185223 A1 | 7/2009 | Kanai et al. |
| 2009/0244594 A1 | 10/2009 | Nuggehalli |
| 2009/0244595 A1 | 10/2009 | Kim et al. |
| 2009/0244596 A1 | 10/2009 | Katano |
| 2009/0316183 A1 | 12/2009 | Wei |
| 2010/0002248 A1 | 1/2010 | Nuggehalli et al. |
| 2010/0002249 A1 | 1/2010 | Nuggehalli et al. |

FOREIGN PATENT DOCUMENTS

| | | |
|---|---|---|
| EP | 1 091 275 A2 | 4/2001 |
| EP | 1 143 695 | 10/2001 |
| EP | 1 143 695 A2 | 10/2001 |
| EP | 1 511 287 | 10/2001 |
| EP | 1 229 724 | 8/2002 |
| EP | 1 229 724 A2 | 8/2002 |
| EP | 1229724 | 8/2002 |
| EP | 1 367 814 | 12/2003 |
| EP | 1 465 052 A2 | 10/2004 |
| EP | 1 621 994 | 2/2006 |
| WO | WO 00/68817 | 11/2000 |

OTHER PUBLICATIONS

European Patent Office, "Partial European Search Report", European patent application 07250426.9-1245, received Mar. 10, 2008, 5 pages.

Claims, European patent application 07250426.9-1245, 2 pages.

European Patent Office, "European Search Report", European patent application 07250426.9-1245, dated Jun. 12, 2008, 19 pages.

European Patent Office, "European Search Report", European patent application EP 08 16 0705, dated Nov. 12, 2008, 10 pages.

European Patent Office, "European Search Report", application No. EP 09 15 6660, dated Jul. 6, 2009, 7 pages.

European Patent Office, "European Search Report", EP application No. EP 07252112, dated Mar. 1, 2010, 6 pages.

European Patent Office, "European Search Report", application No. EP 09156641, dated Jul. 2, 2009, 8 pages.

U.S. Appl. No. 11/148,678, filed Jun. 8, 2005, Notice Of Allowance, mailed May 18, 2010.

U.S. Appl. No. 11/411,248, filed Apr. 25, 2006, Office Action, mailed May 14, 2010.

U.S. Appl. No. 11/656,592, filed Jan. 22, 2007, Office Action, mailed Jul. 26, 2010.

\* cited by examiner

REMOTE STORED PRINT JOB RETRIEVAL

FIELD OF THE INVENTION

The invention relates to printing devices, and more specifically, to a technique for retrieving, to a local printing device, a print job that was previously stored at a remote printing device.

BACKGROUND OF THE INVENTION

Printing devices, such as printers, copy machines, and multi-function peripherals (MFPs) such as the Ricoh Aficio Color 6513 system, sometimes are capable of storing print jobs for later printing. U.S. patent application Ser. No. 11/346,479 describes a technique through which a print job may be sent, over a network, from a computer to a printing device and stored on a hard drive within the printing device. Although the print job is stored at the printing device, the print job is not immediately printed at the printing device. Some time after the print job has been stored at the printing device, a user who caused the print job to be sent to the printing device may enter, through a console at the printing device, a user-name and password combination that is associated with the print job. After the user enters the correct username and password combination at the printing device's console, the user can instruct the printing device to print the stored print job. Such a "locked" printing technique promotes security by preventing sensitive information from being deposited into a printing device's output tray until the user who wanted the information printed is able to be present at the printing device.

The foregoing technique works well as long as the user is able to physically access the printing device at which the print job has been stored by the time the user needs to obtain the printed copy of the print job. Unfortunately, if the user is not able to physically access this printing device, then the user may be unable to obtain the printed copy when the user needs the printed copy. For example, if the user is working temporarily at an office of his company other than the office at which the user normally works, then the user might not be able to access, physically, the console of the printing device at which the user's print job has been stored. Thus, even if the printing devices at both offices are connected via a network, the user may be unable to obtain a printed copy of his print job while physically away from the printing device at which his print job is stored.

Based on the foregoing, there is a need for a technique that allows a user to print a previously stored print job at a printing device that the user currently is able to access physically when the user currently is unable to access physically the printing device at which the print job was previously stored.

SUMMARY OF THE INVENTION

A technique is disclosed for printing, at a local printing device, a print job that was previously stored at a remote printing device. According to one aspect of the technique, a command is received through a console of a local printing device at which a particular print job is not stored. In response to the receipt of the command through the console of the local printing device, the particular print job is requested from a remote printing device at which the particular print job is stored. The particular print job, sent from the remote printing device, is received at the local printing device. The particular print job is then printed at the local printing device.

BRIEF DESCRIPTION OF THE DRAWINGS

Embodiments are illustrated by way of example, and not by way of limitation, in the figures of the accompanying drawings in which like reference numerals refer to similar elements and in which.

DETAILED DESCRIPTION OF THE INVENTION

In the following description, for the purposes of explanation, specific details are set forth in order to provide a thorough understanding of the invention. However, it will be apparent that the invention may be practiced without these specific details. In some instances, well-known structures and devices are depicted in block diagram form in order to avoid unnecessarily obscuring the invention.

Overview

Figure 1:
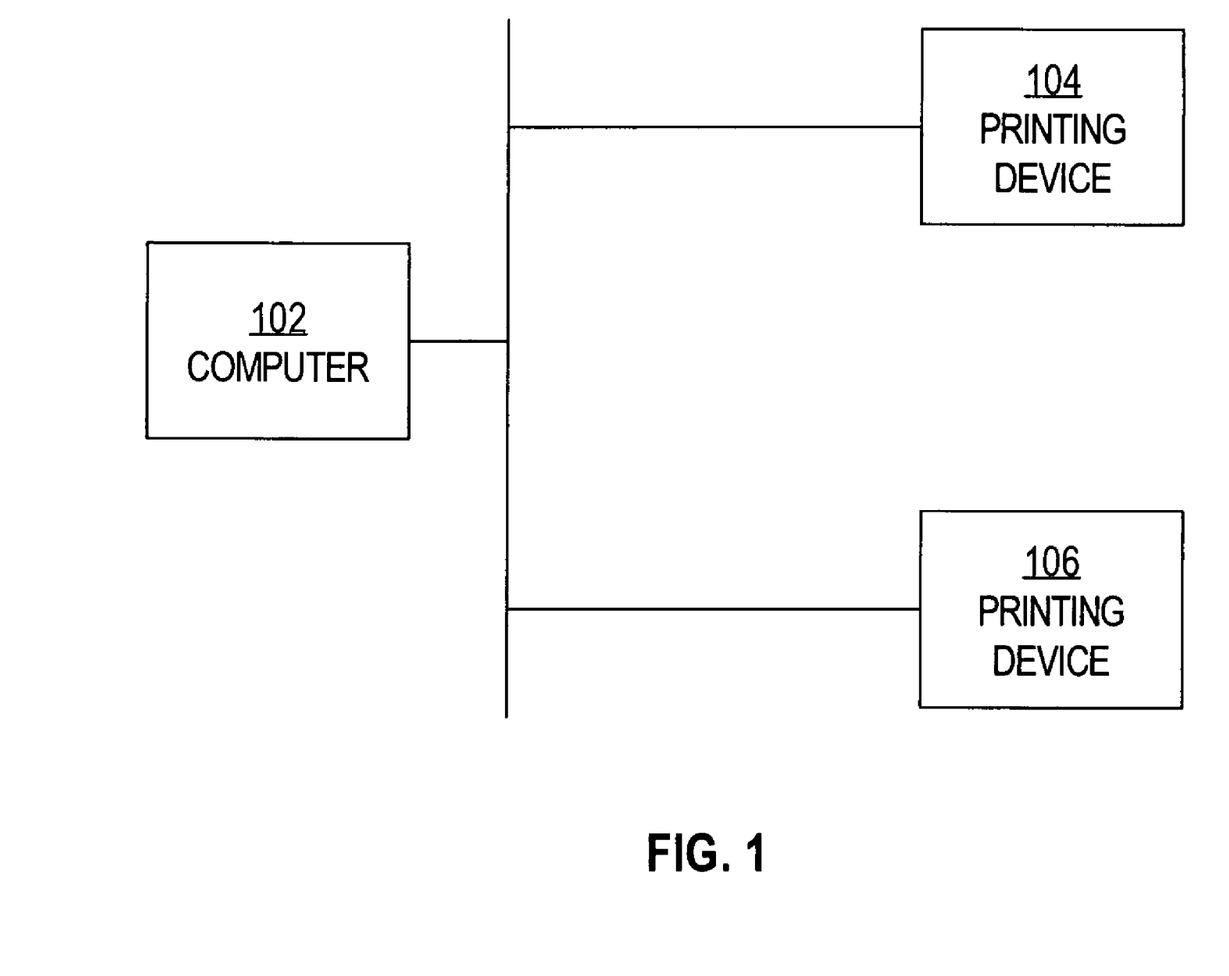
FIG. 1 is a block diagram that depicts an overview of a system in which a print job that was previously stored at a remote printing device is printed at a local printing device, according to an embodiment of the invention.

FIG. 1 is a flow diagram that depicts an overview of a system in which a print job that was previously stored at a remote printing device is printed at a local printing device, according to an embodiment of the invention. The system shown includes a computer 102, a printing device 104, and a printing device 106. Printing devices 104 and 106 may be different kinds of printing devices (e.g., printers, copy machines, MFPs, fax machines, etc.), and may or may not be completely compatible with each other.

Computer 102 and printing devices 104 and 106 are connected communicatively via communication means such as a network. The communication means may include a local area network (LAN) and/or the Internet, for example. The communication means do not need to be physical; for example, in one embodiment of the invention, computer 102 and printing devices 104 and 106 may communicate with each other through wireless network interfaces. Although FIG. 1 shows two printing devices 104 and 106, embodiments of the invention are also applicable to systems that include a greater number of printing devices.

Computer 102, printing device 104, and printing device 106 may be remote from each other. For example, computer 102, printing device 104, and printing device 106 may be located in different rooms or different buildings. Computer 102, printing device 104, and printing device 106 may be miles away from each other.

According to one embodiment of the invention, computer 102 sends (typically in response to a user's command) a print job to printing device 104 via the communication means. Printing device 104 does not immediately print the print job. Instead, printing device 104 stores the job on a persistent storage medium within printing device 104. The persistent storage medium may be a hard drive, for example.

After printing device 104 has stored the print job, the user who commanded computer 102 to send the print job to printing device 104 may provide commands to printing device 104 through a user interface or console provided by printing device 104. The console may be an LCD touch-sensitive screen that is molded into the surface of printing device 104, for example. Entering commands through the console requires the user to be physically present at printing device 104. In response to commands entered through the console (which may, in one embodiment, include a username and password combination), printing device 104 may print a copy of the print job stored at printing device 104.

Additionally or alternatively, after printing device 104 has stored the print job, the user who commanded computer 102 to send the print job to printing device 104 may provide commands to printing device 106 (on which the print job is not stored) through a user interface or console provided by printing device 106. Entering commands through the console requires the user to be physically present at printing device 106. In response to commands entered through the console (which may, in one embodiment, include a username and password combination), printing device 106 may request the print job from printing device 104 via the communication means, receive the print job from printing device 104 via the communication means, and print a copy of the print job.

Thus, even though the print job was stored on printing device 104 rather than printing device 106, a user can print a copy of the print job from printing device 106. This is especially useful when the user currently has physical access to printing device 106 but not printing device 104 or computer 102.

Example Technique

Figure 2A:
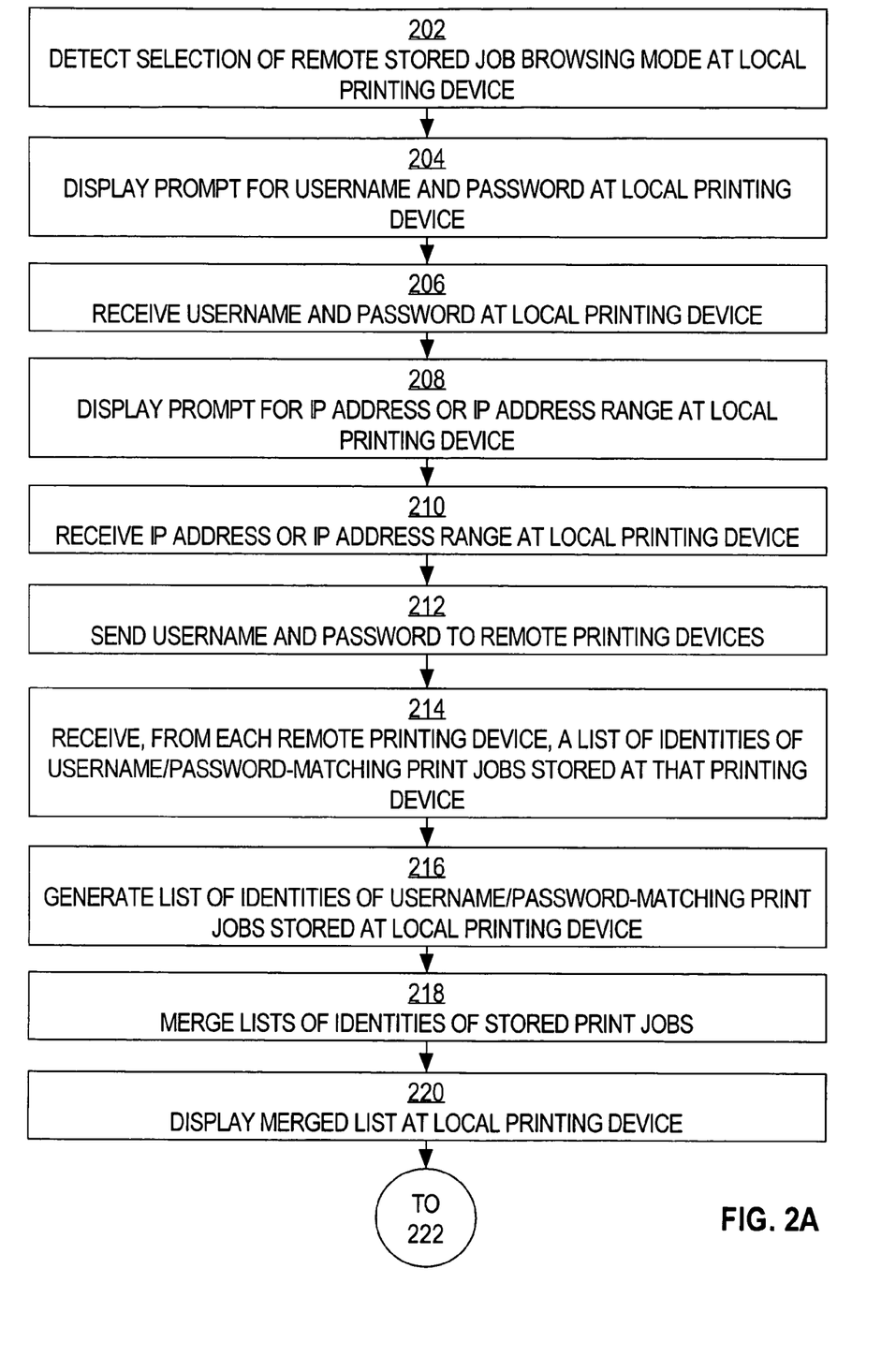
FIGS. 2A-2C show a flow diagram that depicts an example technique through which a print job previously stored on a remote printing device can be printed at a local printing device on which the print job is not currently stored, according to an embodiment of the invention.
Figure 2B:
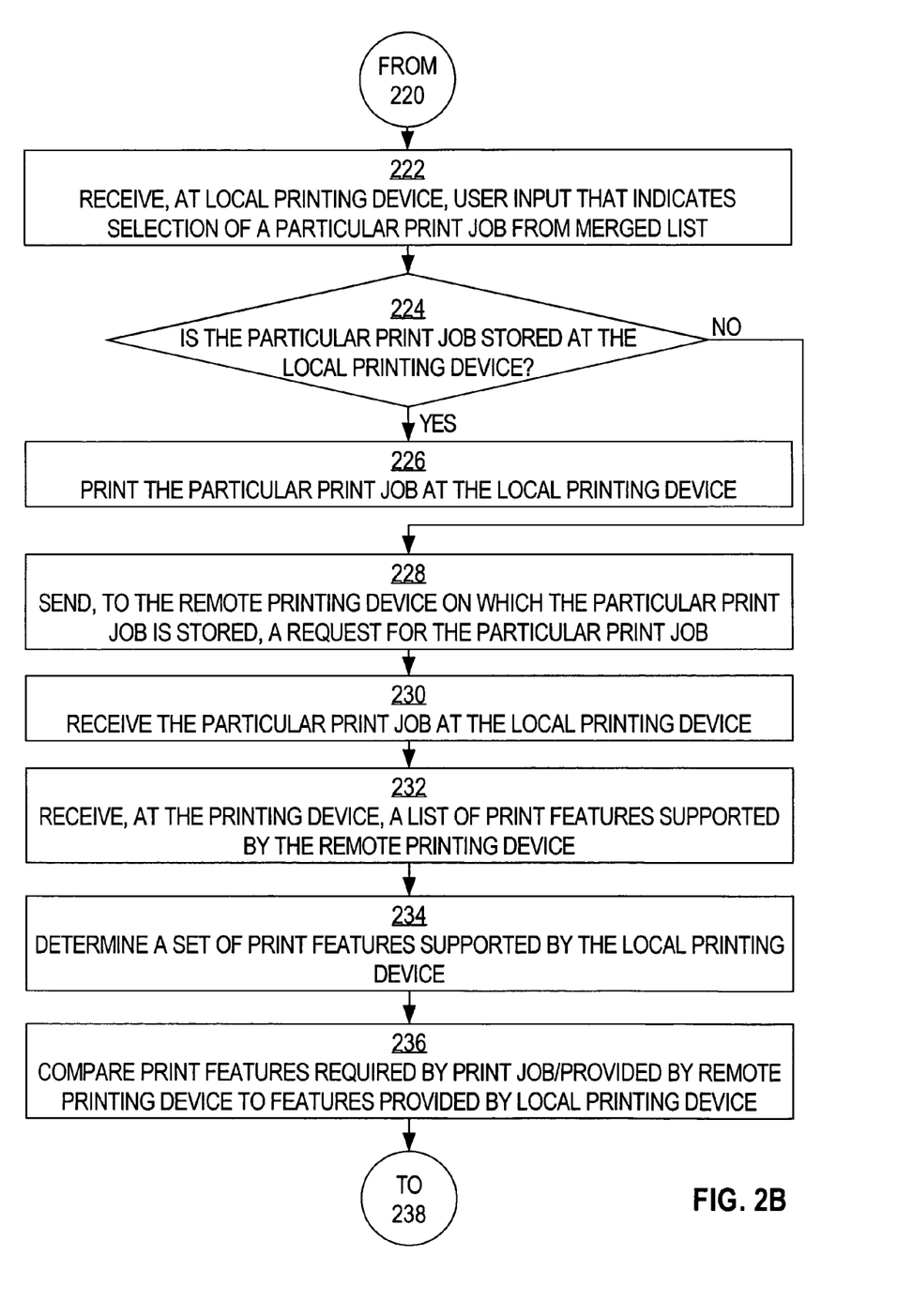
Figure 2C:
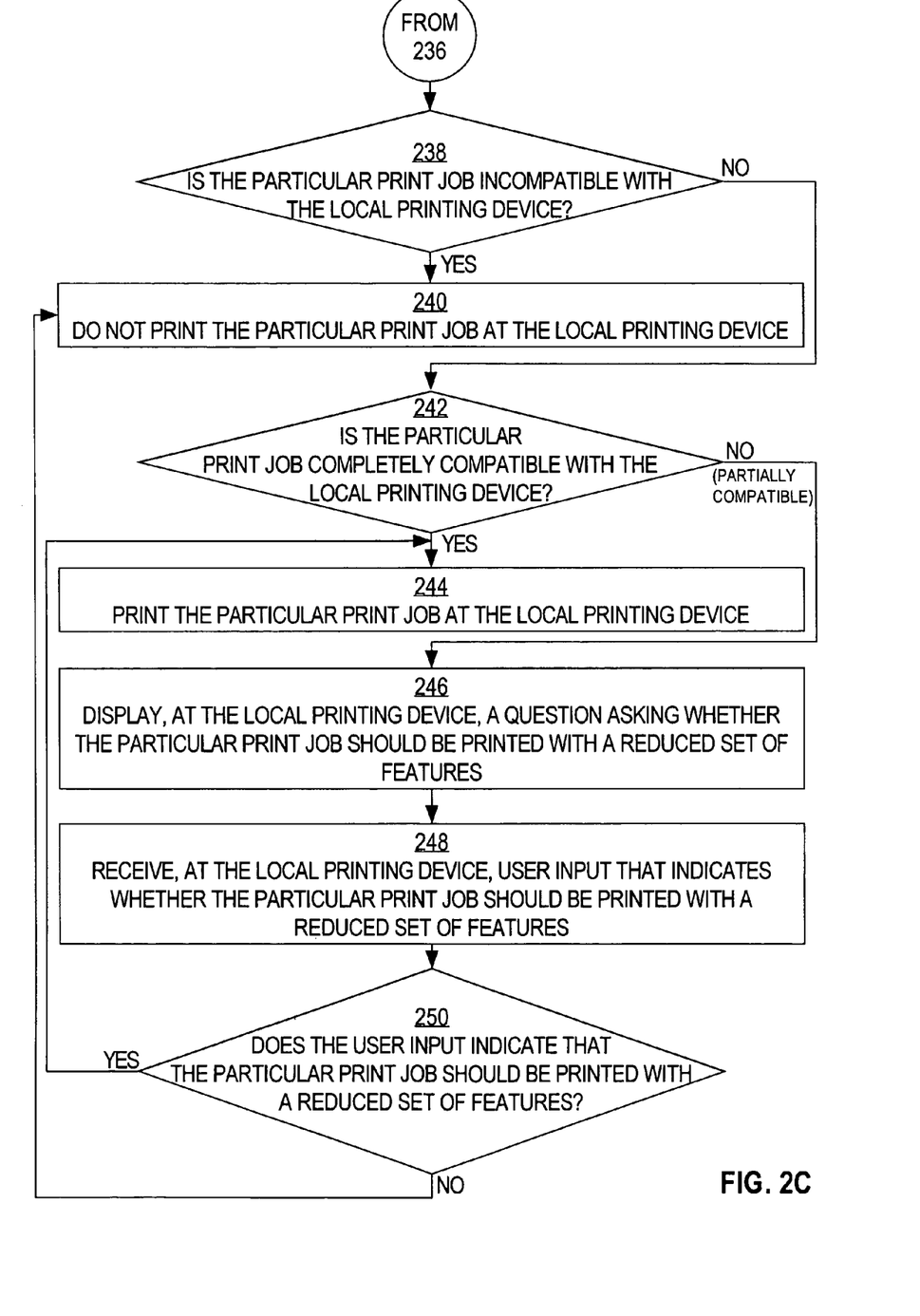

FIGS. 2A-2C show a flow diagram that depicts an example technique through which a print job previously stored on a remote printing device can be printed at a local printing device on which the print job is not currently stored, according to an embodiment of the invention. As used herein, the phrase "local printing device" refers to a printing device to which a user currently has physical access, and the phrase "remote printing device" refers to a printing device to which the user may or may not currently have physical access. The technique may be performed within the system depicted in FIG. 1, for example.

Referring first to FIG. 2A, in block 202, a remote stored job browsing mode is selected at a local printing device. For example, through a console provided at printing device 106, a user can select a user interface element, such as a button or icon, which indicates that printing device 106 should change state to a remote stored job browsing mode.

In block 204, in response to the selection of the remote stored job browsing mode, a prompt for a username and password is displayed at the local printing device. For example, printing device 106 can display, on the console of printing device 106, a prompt for a username and password.

In block 206, a username and password are received at the local printing device. For example, printing device 106 may receive a username and password that a user entered through the console of printing device 106. Although a username and password are used as a credential in an embodiment of the invention, described herein, in alternative embodiments of the invention, different credentials (e.g., a certificate or LDAP entry) could be used instead of or in addition to a username and password.

Optionally, in block 208, a prompt for an Internet Protocol (IP) address or range of IP addresses is displayed at the local printing device. For example, printing device 106 can display, on the console of printing device 106, a prompt for an IP address or range of IP addresses. Alternatively, instead of or in addition to a prompt for an IP address or range of IP addresses, printing device 106 may display a prompt for other information that identifies remote printing devices (e.g., names associated with the remote printing devices).

Optionally, in block 210, an IP address or range of IP addresses are received at the local printing device. For example, printing device 106 may receive an IP address or range of IP addresses that a user entered through the console of printing device 106. Alternatively, instead of or in addition to receiving an IP address or range of IP addresses, printing device 106 may receive other information that identifies remote printing devices (e.g., names associated with the remote printing devices).

In block 212, the username and password combination received in block 206 are sent to a set of one or more remote printing devices. For example, printing device 106 may send the username and password combination to printing device 104 over a network. If an IP address or range of IP addresses (or other printing device-identifying information) was received in block 210, then the set of remote printing devices to which the username and password combination is sent includes the one or more remote printing devices that are associated with the one or more specified IP addresses (or other printing device-identifying information)—each printing device may be configured and associated with a different IP address. Alternatively, if an IP address or range of IP addresses (or other printing device-identifying information) was not specified in block 210, then the set of remote printing devices to which the username and password combination is sent may include each remote printing device that is connected to the same LAN as the local printing device.

According to one embodiment of the invention, when a print job is stored at a remote printing device, that print job is associated with a username and password combination specified by the user who commanded the print job to be stored. For example, the username and password combination may be stored along with the print job on a hard drive at the remote printing device. According to one embodiment of the invention, in response to receiving the username and password combination sent in block 212, each remote printing device to which the username and password combination was sent determines whether any print jobs stored at that remote printing device are associated with the username and password combination. For each stored print job that is associated with the same username and password combination as the combination sent in block 212, each remote printing device may add an identity of that stored print job to a list. Each remote printing device may send its list of identities of matching stored print jobs to the local printing device from which the username and password combination was sent in block 212.

For example, printing device 104 may receive a username and password combination that was sent from printing device 106. In response, printing device 104 may compare the received username and password combination with the username and password combinations associated with each of the stored print jobs that are stored at printing device 104. For each stored print job that is associated with a username and password combination that matches the received username and password combination, printing device 104 may add an identity (e.g., file name) of that stored print job to a list of identities of matching stored print jobs. Thus, stored print jobs that are associated with usernames and passwords that do not match the received username and password will not be added to the list, thereby preventing one user's stored print job from being printed by another user. Along with the identity of each matching stored print job, printing device 104 may add, to the list, information that indicates that the matching stored print job is stored at printing device 104. Afterwards, printing device 104 may send the list to printing device 106 over a network.

In block 214, from each of the one or more remote printing devices in the set to which the username and password combination was sent in block 212, a separate list of stored print job identities is received. Some of the lists may be empty if some of the remote printing devices did not store any print jobs that were associated with matching username and password combinations.

In block 216, a list of identities of print jobs that are (a) stored on the local printing device and (b) associated with the username and password combination received in block 206 is generated. If the local printing device does not store any print jobs that are associated with the username and password combination received in block 206, then the list of identifies generated in block 216 may be empty. For example, printing device 106 may determine whether any print jobs stored on printing device 106 are associated with the username and password combination received in block 206. For each print job that matches the username and password combination, printing device 106 may add an identity (e.g., file name) of that print job to the list.

In block 218, the list(s) of identities received from the remote printing device(s) in block 214 are merged with the list of identifies generated in block 216, thereby forming a master list. For example, printing device 106 may merge these lists to form the master list.

In block 220, the master list of identities of stored print jobs formed in block 218 is displayed at the local printing device. For example, printing device 106 can display, on the console of printing device 106, the master list of identities. In addition to the identities of the stored print jobs, other information about the stored print jobs also may be displayed. For example, for each stored print job, (a) a date on which that print job was stored, and (b) an identity (e.g., IP address, printing device location, and/or printing device brand and type) of the printing device at which that print job is stored also may be displayed. Control passes to block 222 of FIG. 2B.

Referring now to FIG. 2B, in block 222, user input that indicates selection of a particular print job from the master list is received at the local printing device. For example, printing device 106 may receive such user input that a user entered through the console of printing device 106.

In block 224, a determination is made as to whether the particular print job selected in block 222 is stored at the local printing device. For example, printing device 106 may determine whether the particular print job is stored on a hard drive of printing device 106. If the particular print job is stored at the local printing device, then control passes to block 226. Otherwise, control passes to block 228.

In block 226, the particular print job (stored at the local printing device) is printed at the local printing device. For example, printing device 106 may print the particular print job.

Alternatively, in block 228, in response to a determination that the particular print job selected in block 222 is stored at a remote printing device, a request for the particular print job is sent to the remote printing device on which the particular print job is stored. For example, in response to determining that the particular print job is stored at printing device 104, printing device 106 may send, to printing device 104, over a network, a request for the particular print job. The identity of the remote printing device at which the particular print job is stored may be obtained from information contained in the lists received in block 214, for example.

According to one embodiment of the invention, when a remote printing device receives a request of the kind sent in block 228, the remote printing device responds to the request by sending the particular print job identified in the request to the printing device from which the request originated. For example, in response to receiving such a request from printing device 106, printing device 104 may send, to printing device 106, over a network, a print job that is stored at printing device 104 and identified by the request. The print job may be sent using the File Transfer Protocol (FTP), for example.

Additionally, according to one embodiment of the invention, the remote printing device also responds to a request of the kind sent in block 228 by sending, to the request's origin, a list of print features that the remote printing device supports. Such features may include, for example, one or more printer definition languages (PDLs) that the remote printing device supports (e.g., Postscript or non-Postscript only), color printing, duplex mode, stapling, punching, folding, paper sizes, etc. Such a list of print features may be generated and sent using the Simple Network Management Protocol (SNMP), for example. The print features that a printing device supports may be obtained from a Management Information Base (MIB) stored at that printing device, for example.

In block 230, the particular print job is received at the local printing device. For example, printing device 106 may receive, over a network, the particular print job that printing device 104 sent to printing device 106 in response to the request that printing device 106 previously sent to printing device 104.

In block 232, a list of print features supported by the remote printing device from which the particular print job was received is also received at the local printing device. For example, printing device 106 may receive, over a network, a list of print features are printing device 104 supports.

In block 234, a set of print features supported by the local printing device is determined. For example, the print features supported by printing device 106 may be determined using SNMP and a MIB stored at printing device 106.

In block 236, the print features required by the particular print job and/or the print features provided by the remote printing device from which the print job was received are compared to the print features provided by the local printing device. Based on this comparison, a determination may be made as to whether the particular print job is completely compatible, partially compatible, or incompatible with the local printing device. This determination may be made based on rules stored at the local printing device, for example. Control passes to block 238 of FIG. 2C.

According to one embodiment of the invention, if the particular print job can be printed at the local printing device with all of the features specified by the particular print job and provided by the remote printing device, then the particular print job is considered to be completely compatible with the local printing device. If the particular print job can be printed at the local printing device, but only without one or more features specified by the particular print job and/or provided by the remote printing device, then the particular print job is considered to be partially compatible with the local printing device. If the particular print job cannot be printed at all at the local printing device, even with a reduced set of features, then the particular print job is considered to be incompatible with the local printing device.

For example, if the particular print job is formatted according to Postscript, but the local printing device is incapable of understanding Postscript, then the determination may be that the particular print job is incompatible with the local printing device. For another example, if the print job is formatted for printing on a paper size that is larger than any paper size on which the local printing device can print, then the determination may be that the particular print job is incompatible with the local printing device. For another example, if the particular print job comprises color text or images, but the local printing device only can print in black and white, then the determination may be that the particular print job is partially compatible with the local printing device. Similarly, an absence of certain duplex mode, stapling, punching, and folding features of the local printing device may lead to a determination that the particular print job is partially compatible with the local printing device-the particular print job still could be printed at the local printing device, but not with all of the features that would be available if the particular print job had been printed at the remote printing device.

Referring now to FIG. 2C, in block 238, a determination is made as to whether the particular print job is incompatible with the local printing device. For example, printing device 106 may make such a determination based on the comparison performed in block 236. If the particular print job is incompatible with the local printing device, then control passes to block 240. Otherwise, control passes to block 242.

In block 240, the particular print job is not printed at the local printing device. For example, printing device 106 may inform a user, through a console of printing device 106, that the selected print job cannot be printed on the printing device 106 due to compatibility issues.

Alternatively, in block 242, a determination is made as to whether the particular print job is completely compatible with the local printing device. For example, printing device 106 may make sure a determination based on the comparison performed in block 236. If the particular print job is completely compatible with the local printing device, then control passes to block 244. Otherwise, control passes to block 246.

In block 244, the particular print job is printed at the local printing device. For example, printing device 106 may print the particular print job with the features that printing device 106 provides. In one embodiment of the invention, the particular print job is also stored at the local printing device so that the particular print job can be retrieved from remote printing devices if needed.

Alternatively, in block 246, a question asking whether the particular print job should be printed with a reduced set of features is displayed at the local printing device. For example, printing device 106 can display, on the console of printing device 106, a prompt that (a) informs the user that certain features called for in the particular print job and/or provided by the remote printing device are not available at the local printing device, and (b) asks the user to indicate whether the user would like the local printing device to print the particular print job using the features that the local printing device provides.

In block 248, user input that indicates whether the particular print job should be printed at the local printing device with a reduced set of features is received at the local printing device. For example, printing device 106 may detect the user's selection of a "yes" or "no" button or icon through the console of printing device 106.

In block 250, a determination is made as to whether the user input received in block 248 indicates that the particular print job should be printed at the local printing device. If the user input indicates that the particular print job should be printed at the local printing device, then control passes back to block 244. Otherwise, control passes back to block 240.

Implementation Mechanisms

Figure 3:
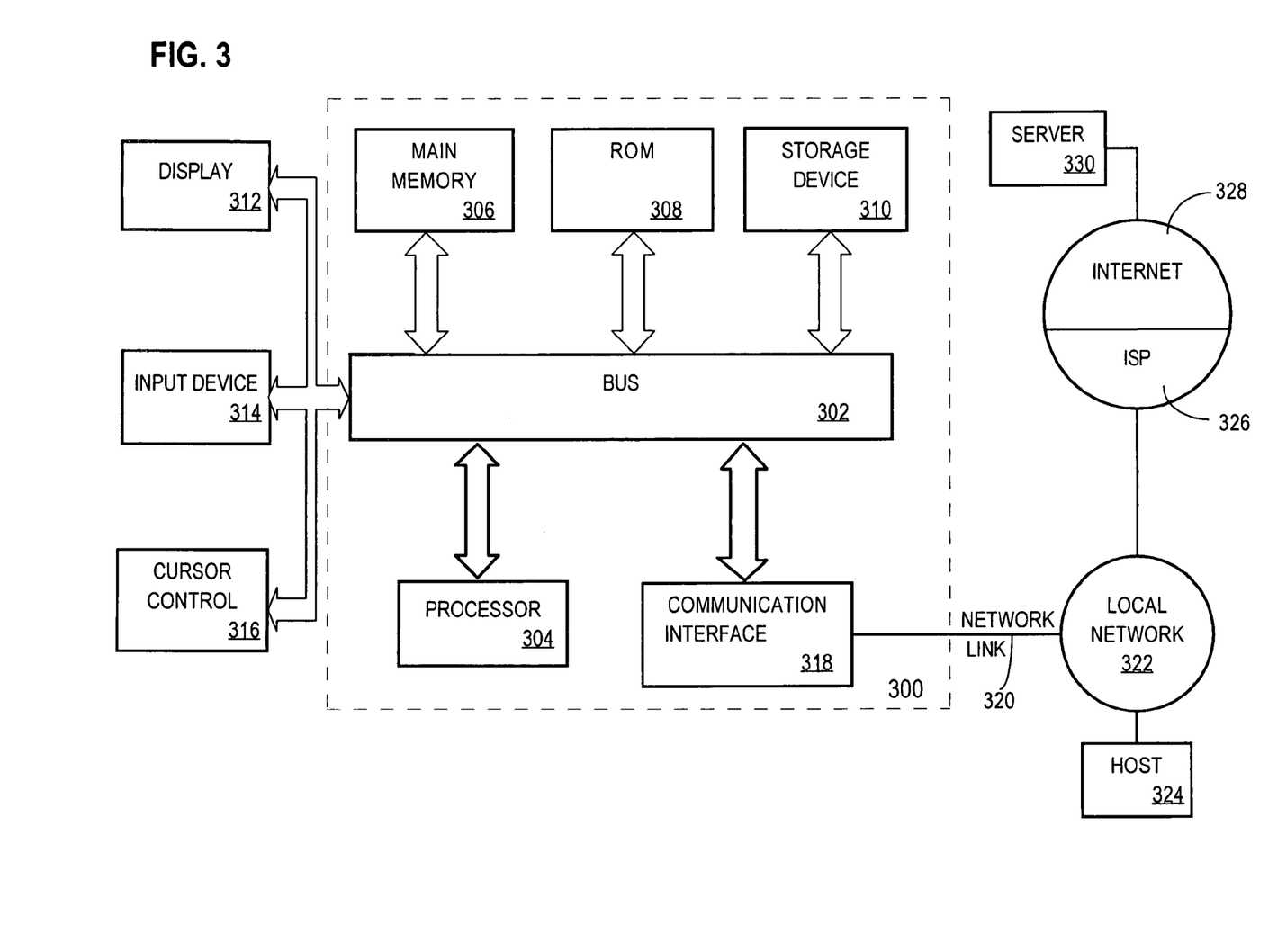
FIG. 3 is a block diagram that depicts a printing device upon which an embodiment of the invention may be implemented.

FIG. 3 is a block diagram that depicts a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a liquid crystal display (LCD), for displaying information to a user. An input device 314, including alphanumeric and other keys, is coupled to bus 302 for communicating information and command selections to processor 304. Another type of user input device is cursor control 316, such as a mouse, trackball, stylus, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 in a wireless communications architecture. According to one embodiment of the invention, wireless communications are provided by computer system 300 in response to processor 304 executing one or more sequences of one or more instructions contained in main memory 306. Such instructions may be read into main memory 306 from another computer-readable medium, such as storage device 310. Execution of the sequences of instructions contained in main memory 306 causes processor 304 to perform the process steps described herein. One or more processors in a multi-processing arrangement may also be employed to execute the sequences of instructions contained in main memory 306. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infrared transmitter to convert the data to an infrared signal. An infrared detector coupled to bus 302 can receive the data carried in the infrared signal and place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a LAN card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the worldwide packet data communication network now commonly referred to as the Internet 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318. In accordance with the invention, one such downloaded application provides for configuring a monitoring system to monitor selected network elements as described herein. Processor 304 may execute the received code as it is received and/or stored in storage device 310 or other non-volatile storage for later execution. In this manner, computer system 300 may obtain application code in the form of a carrier wave.

In the foregoing specification, specific embodiments of the invention have been described. However, various modifications and changes may be made to such embodiments of the invention without departing from the broader spirit and scope of the invention. The specification and drawings are, accordingly, to be regarded in an illustrative rather than a restrictive sense.

What is claimed is:

1. A computer-implemented method for printing a remotely stored print job, the method comprising:
   receiving a command through a console of a first printing device at which a particular print job is not stored;
   in response to receiving the command through the console of the first printing device, the first printing device requesting the particular print job from a second printing device at which the particular print job is stored;
   receiving, at the first printing device, the particular print job sent from the second printing device;
   if one or more specified conditions are satisfied, then printing the particular print job at the first printing device;
   after receiving the particular print job at the first printing device, determining whether the particular print job is completely compatible with the first printing device;
   wherein the step of printing the particular print job at the first printing device is performed in response to a determination that the particular print job is completely compatible with the first printing device.

2. The method of claim 1, further comprising:
   receiving a username and password combination at the first printing device;
   wherein the one or more specified conditions include a condition that the username and password combination must match a username and password combination that is associated with the particular print job.

3. The method of claim 1, further comprising:
   receiving a username at the first printing device;
   sending the username, over a network, to one or more remote printing devices;
   receiving, over a network, from each of the one or more remote printing devices, a list of identifiers of print jobs that are stored in association with the username at that remote printing device; and
   displaying, at the first printing device, one or more identifiers contained in a list of identifiers of print jobs that are stored in association with the username at one or more of the remote printing devices.

4. The method of claim 1, further comprising:
   receiving a username and a password at the first printing device;
   sending the username and the password, over a network, to one or more remote printing devices;
   receiving, over a network, from each of the one or more remote printing devices, a list of identifiers of print jobs that are stored in association with the username and the password at that remote printing device; and
   displaying, at the first printing device, one or more identifiers contained in a list of identifiers of print jobs that are stored in association with the username and the password at least one of the one or more remote printing devices.

5. The method of claim 1, further comprising:
   receiving, over a network, from one or more remote printing devices, one or more lists of identifiers of print jobs that are stored at the one or more remote printing devices;
   generating a local list of identifiers of print jobs that are stored at the first printing device;
   merging the one or more lists with the local list to produce a merged list; and
   displaying the merged list at the first printing device.

6. The method of claim 1, further comprising:
displaying, at the first printing device, a list of identities of two or more print jobs that are stored at one or more printing devices other than the first printing device;
wherein the step of receiving the command through the console of the first printing device comprises receiving user input that indicates selection of an identify of the particular print job form the list.

7. The method of claim 1, further comprising:
receiving a set of one or more Internet Protocol (IP) addresses at the first printing device;
sending one or more requests over a network to one or more remote printing devices that are associated with IP addresses in the set;
receiving, over a network, from each of the one or more remote printing devices, a list of identifiers of print jobs that are stored at that remote printing device; and
displaying, at the first printing device, one or more identifiers contained in one or more lists of identifiers of print jobs received from one or more of the remote printing devices.

8. A computer-implemented method for printing a remotely stored print job, the method comprising:
receiving a command through a console of a first printing device at which a particular print job is not stored;
in response to receiving the command through the console of the first printing device, the first printing device requesting the particular print job from a second printing device at which the particular print job is stored;
receiving, at the first printing device, the particular print job sent from the second printing device;
if one or more specified conditions are satisfied, then printing the particular print job at the first printing device;
after receiving the particular print job at the first printing device, determining whether the particular print job is fully compatible with the first printing device;
in response to a determination that the particular print job is not fully compatible with the first printing device, determining whether the particular print job is partially compatible with the first printing device;
in response to a determination that the particular print job is partially compatible with the first printing device, displaying, at the first printing device, a question that asks a user whether the user wants the particular print job to be printed with a reduced set of features; and
receiving, at the first printing device, user input that indicates that the user wants the particular print job to be printed with the reduced set of features;
wherein the step of printing the particular print job at the first printing device is performed in response to receipt, at the first printing device, of the user input that indicates that the user wants the particular print job to be printed with the reduced set of features.

9. A computer-implemented method for printing a remotely stored print job, the method comprising:
receiving a command through a console of a first printing device at which a particular print job is not stored;
in response to receiving the command through the console of the first printing device, the first printing device requesting the particular print job from a second printing device at which the particular print job is stored;
receiving, at the first printing device, the particular print job sent from the second printing device;
if one or more specified conditions are satisfied, then printing the particular print job at the first printing device;
after receiving the particular print job at the first printing device, determining whether the particular print job specifies a feature that the first printing device is not configured to provide;
in response to a determination that the particular print job specifies a feature that the first printing device is not configured to provide, displaying, at the first printing device, a question that asks a user whether the user wants the particular print job to be printed with a reduced set of features; and
receiving, at the first printing device, user input that indicates that the user wants the particular print job to be printed with the reduced set of features;
wherein the step of printing the particular print job at the first printing device is performed in response to receipt, at the first printing device, of the user input that indicates that the user wants the particular print job to be printed with the reduced set of features; and
wherein the feature that the first printing device is not configured to provide is one of a color printing feature, a duplex mode feature, a stapling feature, a punching feature, and a folding feature.

10. A computer-readable medium carrying one or more sequences of instructions for printing a remotely stored print job, wherein execution of the one or more sequences of instructions by one or more processors causes the one or more processors to perform steps comprising:
receiving a command through a console of a first printing device at which a particular print job is not stored;
in response to receiving the command through the console of the first printing device, requesting the particular print job from a second printing device at which the particular print job is stored;
receiving, at the first printing device, the particular print job sent from the second printing device;
if one or more specified conditions are satisfied, then printing the particular print job at the first printing device;
after receiving the particular print job at the first printing device, determining whether the particular print job is completely compatible with the first printing device;
wherein the step of printing the particular print job at the first printing device is performed in response to a determination that the particular print job is completely compatible with the first printing device.

11. The computer-readable medium of claim 10, wherein execution of the one or more sequences of instructions by the one or more processors causes the one or more processors to perform steps comprising:
receiving a username and password combination at the first printing device;
wherein the one or more specified conditions include a condition that the username and password combination must match a username and password combination that is associated with the particular print job.

12. The computer-readable medium of claim 10, wherein execution of the one or more sequences of instructions by the one or more processors causes the one or more processors to perform steps comprising:
receiving a username at the first printing device;
sending the username, over a network, to one or more remote printing devices;
receiving, over a network, from each of the one or more remote printing devices, a list of identifiers of print jobs that are stored in association with the username at that remote printing device; and
displaying, at the first printing device, one or more identifiers contained in a list of identifiers of print jobs that are stored in association with the username at one or more of the remote printing devices.

13. The computer-readable medium of claim 10, wherein execution of the one or more sequences of instructions by the one or more processors causes the one or more processors to perform steps comprising:
receiving a username and a password at the first printing device;
sending the username and the password, over a network, to one or more remote printing devices;
receiving, over a network, from each of the one or more remote printing devices, a list of identifiers of print jobs that are stored in association with the username and the password at that remote printing device; and
displaying, at the first printing device, one or more identifiers contained in a list of identifiers of print jobs that are stored in association with the username and the password at least one of the one or more remote printing devices.

14. The computer-readable medium of claim 10, wherein execution of the one or more sequences of instructions by the one or more processors causes the one or more processors to perform steps comprising:
receiving, over a network, from one or more remote printing devices, one or more lists of identifiers of print jobs that are stored at the one or more remote printing devices;
generating a local list of identifiers of print jobs that are stored at the first printing device;
merging the one or more lists with the local list to produce a merged list; and
displaying the merged list at the first printing device.

15. The computer-readable medium of claim 10, wherein execution of the one or more sequences of instructions by the one or more processors causes the one or more processors to perform steps comprising:
displaying, at the first printing device, a list of identities of two or more print jobs that are stored at one or more printing devices other than the first printing device;
wherein the step of receiving the command through the console of the first printing device comprises receiving user input that indicates selection of an identify of the particular print job form the list.

16. The computer-readable medium of claim 10, wherein execution of the one or more sequences of instructions by the one or more processors causes the one or more processors to perform steps comprising:
receiving a set of one or more Internet Protocol (IP) addresses at the first printing device;
sending one or more requests over a network to one or more remote printing devices that are associated with IP addresses in the set;
receiving, over a network, from each of the one or more remote printing devices, a list of identifiers of print jobs that are stored at that remote printing device; and
displaying, at the first printing device, one or more identifiers contained in one or more lists of identifiers of print jobs received from one or more of the remote printing devices.

17. A computer-readable medium carrying one or more sequences of instructions for printing a remotely stored print job, wherein execution of the one or more sequences of instructions by one or more processors causes the one or more processors to perform steps comprising:
receiving a command through a console of a first printing device at which a particular print job is not stored;
in response to receiving the command through the console of the first printing device, requesting the particular print job from a second printing device at which the particular print job is stored;
receiving, at the first printing device, the particular print job sent from the second printing device;
if one or more specified conditions are satisfied, then printing the particular print job at the first printing device;
after receiving the particular print job at the first printing device, determining whether the particular print job is fully compatible with the first printing device;
in response to a determination that the particular print job is not fully compatible with the first printing device, determining whether the particular print job is partially compatible with the first printing device;
in response to a determination that the particular print job is partially compatible with the first printing device, displaying, at the first printing device, a question that asks a user whether the user wants the particular print job to be printed with a reduced set of features; and
receiving, at the first printing device, user input that indicates that the user wants the particular print job to be printed with the reduced set of features;
wherein the step of printing the particular print job at the first printing device is performed in response to receipt, at the first printing device, of the user input that indicates that the user wants the particular print job to be printed with the reduced set of features.

18. A computer-readable medium carrying one or more sequences of instructions for printing a remotely stored print job, wherein execution of the one or more sequences of instructions by one or more processors causes the one or more processors to perform steps comprising:
receiving a command through a console of a first printing device at which a particular print job is not stored;
in response to receiving the command through the console of the first printing device, requesting the particular print job from a second printing device at which the particular print job is stored;
receiving, at the first printing device, the particular print job sent from the second printing device;
if one or more specified conditions are satisfied, then printing the particular print job at the first printing device;
after receiving the particular print job at the first printing device, determining whether the particular print job specifies a feature that the first printing device is not configured to provide;
in response to a determination that the particular print job specifies a feature that the first printing device is not configured to provide, displaying, at the first printing device, a question that asks a user whether the user wants the particular print job to be printed with a reduced set of features; and
receiving, at the first printing device, user input that indicates that the user wants the particular print job to be printed with the reduced set of features;
wherein the step of printing the particular print job at the first printing device is performed in response to receipt, at the first printing device, of the user input that indicates that the user wants the particular print job to be printed with the reduced set of features; and
wherein the feature that the first printing device is not configured to provide is one of a color printing feature, a duplex mode feature, a stapling feature, a punching feature, and a folding feature.

* * * * *